(12) United States Patent
Suchecki

(10) Patent No.: US 7,243,929 B2
(45) Date of Patent: Jul. 17, 2007

(54) UTILITY CART

(76) Inventor: Glen R. Suchecki, 2020 Tally Ho Dr., Wall, NJ (US) 07719

( * ) Notice: Subject to any disclaimer, the term of this patent is extended or adjusted under 35 U.S.C. 154(b) by 209 days.

(21) Appl. No.: 11/110,876

(22) Filed: Apr. 21, 2005

(65) Prior Publication Data

US 2006/0237933 A1     Oct. 26, 2006

(51) Int. Cl.
*B62B 3/00*     (2006.01)
(52) U.S. Cl. ............................ 280/79.2; 280/33.991; 280/33.992; 280/33.993; 280/33.994; 280/33.995; 280/33.996; 280/33.997
(58) Field of Classification Search ............... 280/79.2, 280/33.991–33.997, 47.34; D34/12–18
See application file for complete search history.

(56) References Cited

U.S. PATENT DOCUMENTS

| | | | |
|---|---|---|---|
| 1,424,690 A | | 8/1922 | Syers |
| 1,683,203 A | | 9/1928 | Jetel |
| 1,962,661 A | | 6/1934 | Kruschwitz |
| 2,789,610 A | | 4/1957 | Pritchard |
| 3,743,122 A | | 7/1973 | Fortriede |
| 3,837,667 A | * | 9/1974 | Sernovitz ................. 280/47.34 |
| 4,595,107 A | | 6/1986 | Welsch |
| 4,656,952 A | * | 4/1987 | Schweizer .................... 108/11 |
| 4,986,555 A | | 1/1991 | Andreen |
| D341,238 S | * | 11/1993 | Sloan, III ..................... D34/18 |
| 5,482,238 A | * | 1/1996 | Kreiter .................. 248/222.12 |
| 5,611,554 A | | 3/1997 | Eckloff |
| D412,075 S | * | 7/1999 | Gingrich et al. ............. D6/479 |
| D426,043 S | * | 5/2000 | Lu ............................... D34/21 |
| 6,328,329 B1 | * | 12/2001 | Smith ......................... 280/639 |
| 6,354,619 B1 | | 3/2002 | Kim |
| 6,364,138 B1 | * | 4/2002 | Chen .......................... 211/187 |
| 6,691,879 B1 | * | 2/2004 | Alvarez ...................... 211/175 |
| 6,877,828 B2 | * | 4/2005 | Strong ...................... 312/249.8 |
| 2005/0006877 A1 | | 1/2005 | Kachkovsky |

* cited by examiner

*Primary Examiner*—Christopher P. Ellis
*Assistant Examiner*—Cynthia F. Collado
(74) *Attorney, Agent, or Firm*—Richard C. Litman

(57) ABSTRACT

The utility cart has a first pair of corner posts, a second pair of corners posts, a shelf, a front support bar, a pair of parallel side support bars, and a back support bar, which is particularly suited for supporting a drawstring garment bag for receiving garments being dispatched from a conveyor dryer. For added support and rigidity, the utility cart is also provided with a pair of parallel side support bars, each side support bar extending from a first corner post to a second corner post. For added ease of movement, the utility cart can also be provided with swivel-wheel caster assemblies on each of the four posts. The utility cart and drawstring garment bag can be provided as a kit along with a wedge member and a set of size separators.

5 Claims, 4 Drawing Sheets

UTILITY CART

BACKGROUND OF THE INVENTION

1. Field of the Invention

The present invention relates to carts, and more specifically to a utility cart for use with a removable garment bag.

2. Description of the Related Art

Commercial conveyor drying machines are frequently used in the screen printing industry for drying the ink on screen printed garments. As the dried garments come off of the conveyor and are dispatched from the machine, they are often caught in cardboard boxes that are used to store and ship the finished garments. However, the use of cardboard boxes is extremely inconvenient. For example, once the boxes are full, they are extremely heavy and difficult to move and ship. The use of cardboard boxes also requires constant supervision as the garments must be arranged by hand so as not to pile up on one side of the box. Also, since garments of the same size (e.g. S, M, L, XL, etc.) are passed through the drying machine at the same time, the machine must be stopped every time a new size is to be loaded, and a new cardboard box must be retrieved in order to keep the garments separated by size.

This is a need for a utility cart that is designed to catch garments being dispatched from a conveyor dryer. It is desirable that the cart be a mobile cart capable of supporting a drawstring garment bag that can hold a large quantity of garments, making the packaging, storage, and transportation of the garments easier. Thus, a utility cart solving the aforementioned problems is desired.

SUMMARY OF THE INVENTION

The utility cart of the present invention has a first pair of corner posts, a second pair of corners posts, a shelf, a front support bar, a pair of parallel side support bars, and a back support bar, which is particularly suited for supporting a garment bag for receiving garments being dispatched from a conveyor dryer.

The utility cart, preferably formed of metal shelving frame material, is designed to fit beside the conveyor dryer to catch finished garments while providing maximum capacity and ease of use. The second pair of corner posts is shorter than the first pair of corner posts, providing an easy way for the cart to slide under the edge of the conveyor, where the garments are dispatched, while still allowing a large capacity garment bag to be supported. A shelf is supported by the four corner posts near the bottom of the posts and is useful for supporting the bottom side of the garment bag when it is in place on the cart.

A front support bar, extending between the first pair of corner posts in a position substantially near the top of the first pair of corner posts, and a back support bar, extending between the second pair of corner posts in a position substantially near the top of the second pair of corners posts, are used primarily to support a drawstring garment bag on the cart. The garment bag may hang over the front and back support bar, providing open access to the bag for garments as they are dispatched from the conveyor dryer. Once the bag is full, the drawstring bag may be easily removed without the need for lifting, and another bag can be inserted in its place.

For added support and rigidity, the utility cart is also provided with a pair of parallel side support bars, each side support bar extending from a first corner post to a second corner post. For added ease of movement, the utility cart can also be provided with conventional swivel-wheel caster assemblies on each of the four posts.

The utility cart and drawstring garment bag, preferably made of canvas or a like material, can be provided as a kit along with a wedge member and a set of size separators. The wedge member is designed to fit on the shelf of the utility cart and is used to filter garments toward the larger, more spacious end of the garment bag as they are dispatched from the conveyor dryer, providing a more even distribution within the bag. The size separators, preferably made of the same material as the garment bag, are designed to fit inside the garment bag and act as dividers between different garment sizes. For example, after all the small-sized garments have been dispatched, a size separator marked "S" can be inserted into the bag to divide those garments from the next set to be dispatched from the dryer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
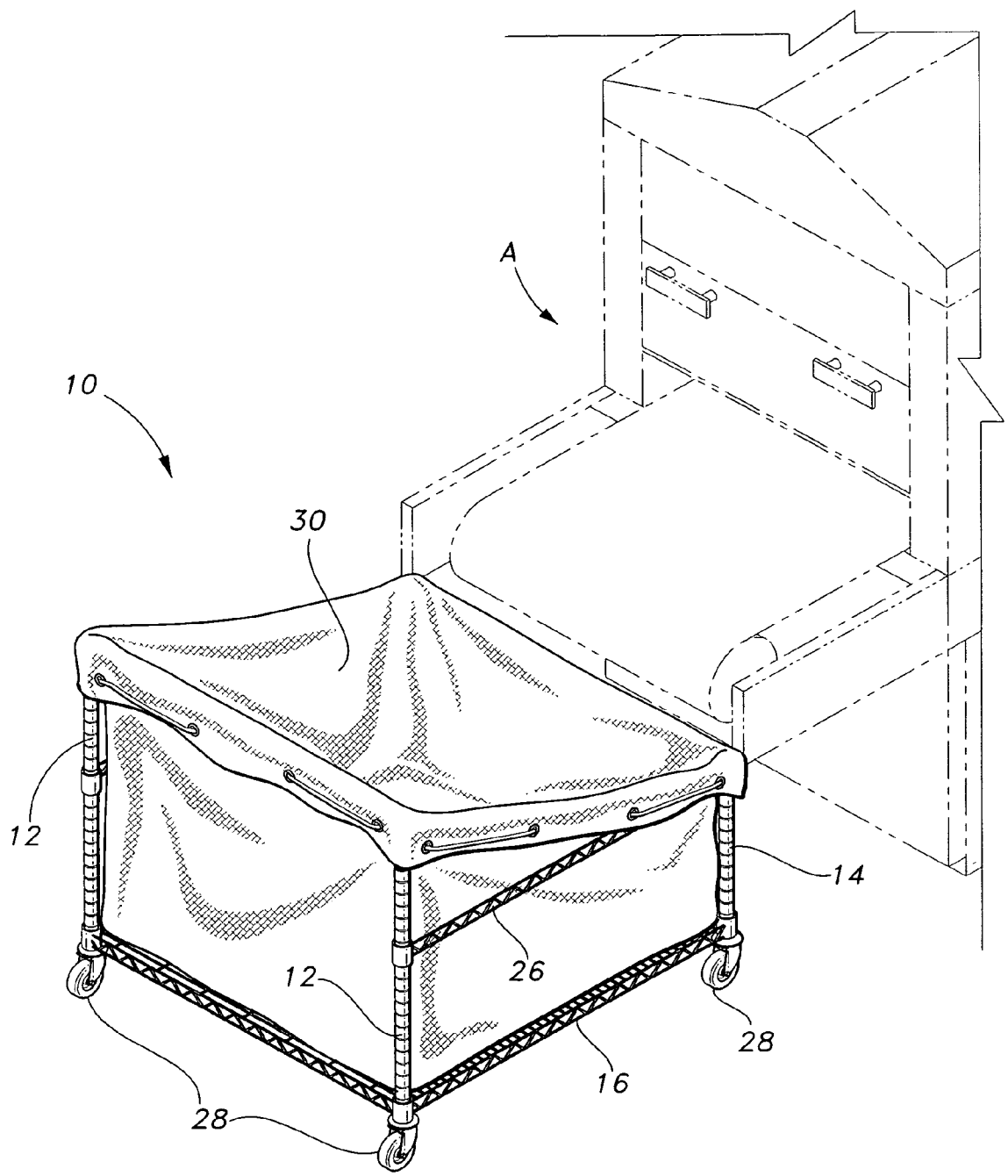
FIG. 1 is an environmental, perspective view of a utility cart with attached garment bag according to the present invention.

The present invention is a utility cart, designated generally as 10 in the drawings.

Figure 2:
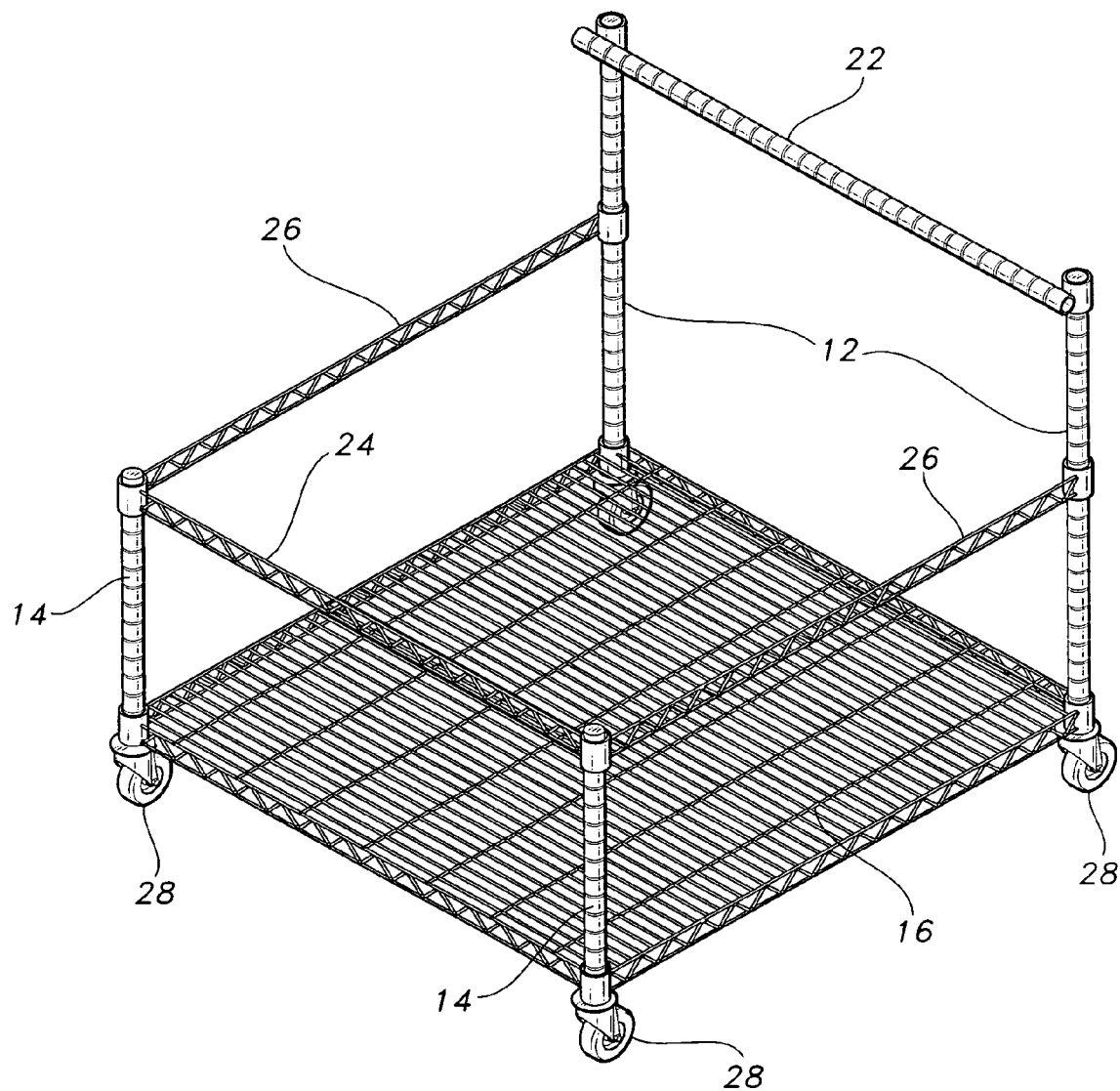
FIG. 2 is a perspective view of a utility cart according to the present invention.

Referring to FIGS. 1 and 2 of the drawings, utility cart 10 includes first corner posts 12, second corner posts 14, shelf 16, front support bar 22, back support bar 24, parallel side support bars 26, swivel-wheel caster assemblies 28, and garment bag 30. Utility cart 10 is preferably used to catch garments that are being dispatched from conveyor dryer A. Conveyor dryer A is a standard commercial printing industry dryer used for drying the ink on garments that have just been screen printed.

Second corner posts 14 are shorter than first corner posts 12 in order to allow utility cart 10 to fit along or just under the dispatching belt of conveyor dryer A. Front support bar 22, extending between first corner posts 12 substantially near the top of first corner posts 12, and back support bar 24, extending between second corner posts 14 substantially near the top of second corner posts 14, provide peripheral support for garment bag 30. Garment bag 30 is designed to be supported tightly by front support bar 22 and back support bar 24, such that it is capable of receiving the maximum quantity of garments being dispatched from the conveyor dryer A. In this manner, garment bag 30 can be easily removed from front support bar 22 and back support bar 24 and carried away when it is full without the need to lift it, helping to prevent injury from lifting such a heavy object. In the preferred embodiment, garment bag 30 is a drawstring-type bag made from canvas or a similar material.

Shelf 16 is supported by first corner posts 12 and second corner post 14 substantially near the bottom of first corner posts 12 and second corner posts 14. Shelf 16 is provided to support garment bag 30 along its bottom side. Swivel-wheel caster assemblies 28 are provided at the bottom of first corner posts 12 and second corner posts 14 for allowing utility cart 10 to be moved along the surface of the ground. Front support bar 22 provides a handle mechanism for steering utility cart 10 when it is desired for utility cart 10 to be moved. Parallel side support bars 26, each extending from a first corner post 12 to a second corner post 14, provide increased support and rigidity for utility cart 10. In the preferred embodiment, first corner posts 12, second corner posts 14, shelf 16, front support bar 22, back support bar 24, and parallel side support bars 26 are standard chrome-plated steel shelving frame members.

Figure 3:
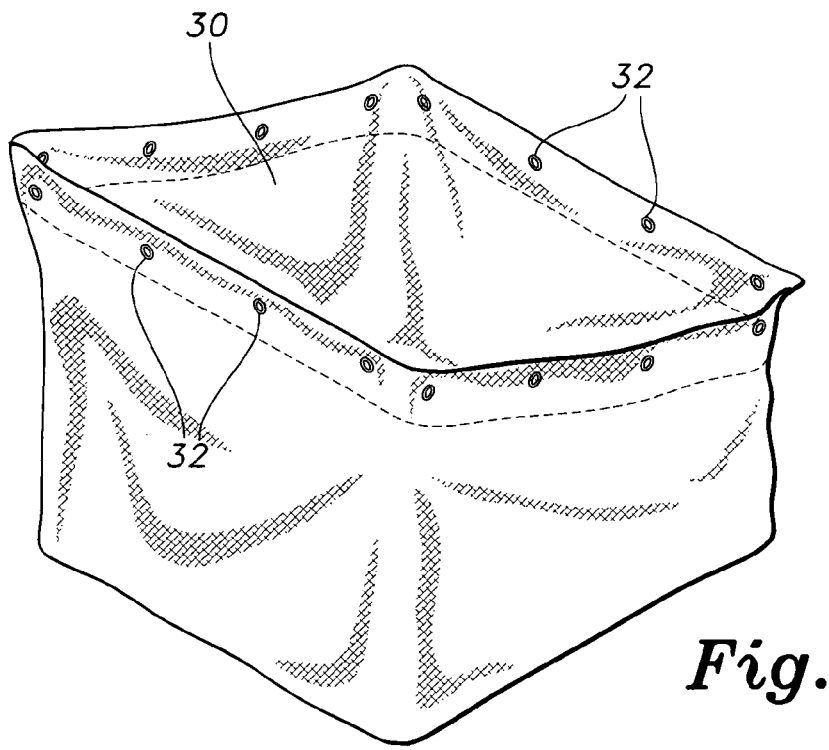
FIG. 3 is a perspective view of a garment bag for use with a utility cart according to the present invention with the rim of the bag opening folded up.
Figure 4:
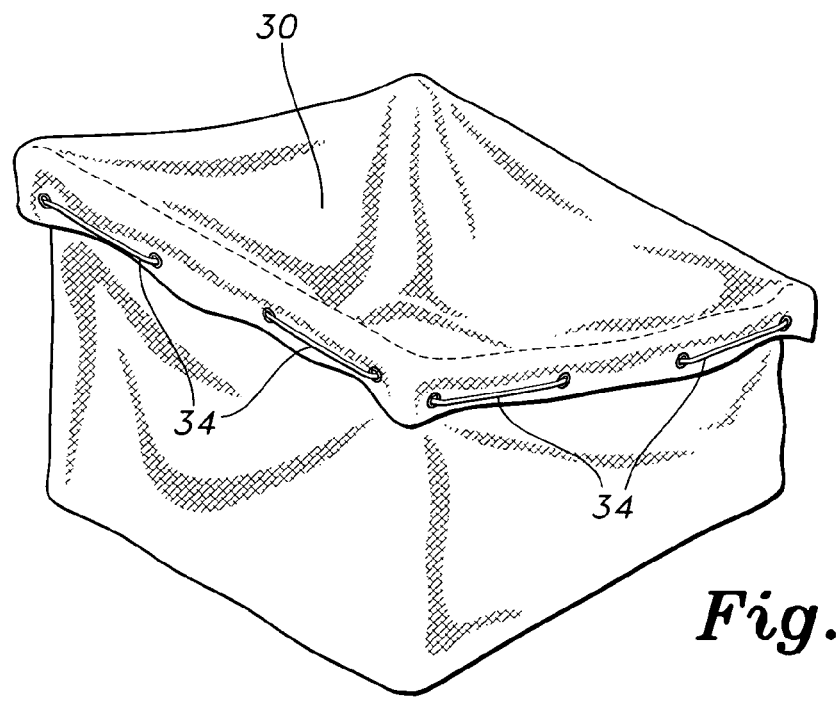
FIG. 4 is a perspective view of a garment bag for use with a utility cart according to the present invention with the rim of the bag opening folded down and a drawstring inserted through the grommets.

FIGS. 3 and 4 show a preferred embodiment of garment bag 30 used in association with the utility cart (not shown). Garment bag 30 has a sloped opening and is provided with an upper flap around the opening for engaging the front and back support bars on the utility cart. Grommets 32 are located along the flap and are provided to support drawstring 34. Drawstring 34 helps garment bag 30 maintain a tight fit around the front and back support bars of the utility cart and is used for simple closure and carrying of garment bag 30.

Figure 5:
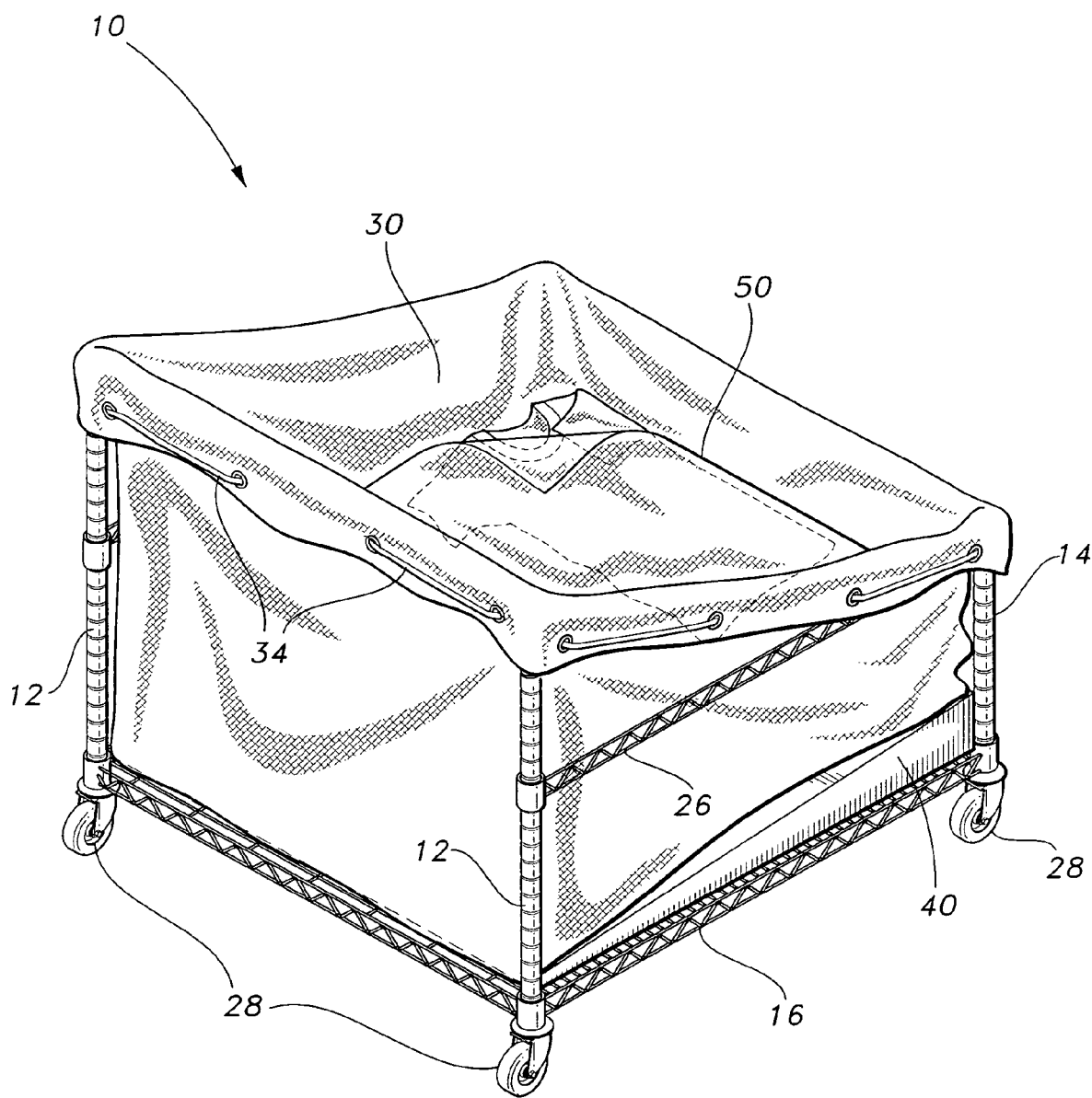
FIG. 5 is a perspective view of a utility cart with attached garment bag showing use of the wedge and a size separator according to the present invention.

FIG. 5 shows utility cart 10 with wedge 40 and size separator 50. Wedge 40 is designed to fit onto shelf 16 and slopes from second corner posts 14 toward first corner posts 12. Wedge 40 allows garments that are being dispatched from the conveyor dryer (not shown) into garment bag 30 to be shuffled toward the larger, and more empty, part of garment bag 30, preventing an excess of garments from building up in garment bag 30 in a position right below the dispatching belt of the conveyor dryer.

Size separator 50 is a piece of pliable material designed to fit inside of garment bag 30 and is used as a divider for different sized garments housed within the same garment bag. As for example, after all the "small" sized garments have been dispatched from the conveyor dryer into garment bag 30, size separator 50 can be inserted into the bag to divide those garments from the next set to be dispatched from the dryer. In the preferred embodiment, size separator 50 is made from canvas or a like material and is provided with size indicating indicia such as S, M, L, XL, or XXL.

It is to be understood that the present invention is not limited to the embodiments described above, but encompasses any and all embodiments within the scope of the following claims.

I claim:

1. A utility cart, comprising:
    a first pair of corner posts having a lower end;
    a swivel-wheel caster assembly mounted on the lower end of each of the posts;
    a second pair of corners posts, the second pair of corner posts being shorter than the first pair of corner posts and having a lower end;
    a swivel-wheel caster assembly mounted on the lower end of the second pair of corner posts;
    a shelf, the shelf being supported by the first and second pairs of corner posts adjacent the lower ends of the first and second pairs of corner posts;
    a front support bar extending between the first pair of corner posts adjacent an upper end of the first pair of corner posts;
    a pair of parallel side support bars extending from a first corner post to a second corner post;
    a back support bar extending between the second pair of corner posts adjacent an upper end of the second pair of corners posts; and
    a garment bag having a drawstring for supporting an open mouth of the garment bag about the front support bar and the back support bar.

2. The utility cart according to claim 1, wherein the garment bag is made of canvas.

3. The utility cart according to claim 1, wherein the posts, the shelf and the support bars are made of chrome-plated steel.

4. A kit for catching and storing garments as the garments are dispatched from a conveyor dryer, comprising:
    a utility cart having:
        a first pair of corner posts having a lower end;
        a swivel-wheel caster assembly mounted on the lower end of each of the posts;
        a second pair of corners posts, the second pair of corner posts being shorter than the first pair of corner posts and having a lower end;
        a swivel-wheel caster assembly mounted on the lower end of the second pair of corner posts;
        a shelf, the shelf being supported by the first and second pairs of corner posts adjacent the lower ends of the first and second pairs of corner posts;
        a front support bar extending between the first pair of corner posts adjacent an upper end of the first pair of corner posts;
        a pair of parallel side support bars extending from a first corner post to a second corner post;
        a back support bar extending between the second pair of corner posts adjacent an upper end of the second pair of corners posts; and
        a garment bag having a drawstring for supporting an open mouth of the garment bag about the front support bar and the back support bar;
    a wedge removably disposed on the shelf sloping from the second pair of corner posts toward the first pair of corner posts beneath the garment bag; and
    at least one size separators made from a pliable material and removably disposed in the garment bag for separating garments of different sizes within the garment bag.

5. The kit for catching and storing garments according to claim 4, wherein each size separator is marked with sizing indicia including S, M, L, XL, and XXL.

* * * * *